April 26, 1955     D. T. MacROBERTS     2,706,908
APPARATUS FOR DETERMINING VOLUMES OF SOLIDS
Filed Feb. 7, 1952

Donald T. MacRoberts
INVENTOR.

United States Patent Office 2,706,908
Patented Apr. 26, 1955

2,706,908

APPARATUS FOR DETERMINING VOLUMES OF SOLIDS

Donald T. MacRoberts, Shreveport, La., assignor to United Gas Corporation, Shreveport, La., a corporation of Delaware Application February 7, 1952, Serial No. 270,363

3 Claims. (Cl. 73—149)

This invention relates to an apparatus for determining volumes of solids, and particularly to a volumeter for determining volumes of well cores.

The volumetric capacity of an oil or gas-bearing rock to hold petroleum fluids is of great practical interest. The quantitative measure of this capacity is called porosity, which may be defined as the fraction of the bulk volume that is not occupied by the solid rock matrix. In oil and gas reservoirs, the porosity represents the percentage of the total space that is available for occupancy by either liquids or gases. The measurement of the bulk volume of a rock sample is a necessary step in the measurement of the porosity of a reservoir formation.

The bulk volume of solid samples are commonly measured by the displacement of a liquid which does not penetrate the sample, or by saturating the sample with a liquid and volumetrically displacing a suitable liquid with the saturated sample. The sample may also be covered with a thin coating of paraffin, collodion, or a similar material to prevent penetration of the displacement liquid. Since mercury will not enter small pores, except under a high pressure difference, it is commonly used as the immersion liquid and the volume computed from the loss in weight by immersion or by direct observation of the volumetric displacement.

The true solid volume is commonly measured by immersing the sample in a liquid which will completely penetrate the void spaces. In this case special precautions must be taken to minimize the occlusion of air or foreign liquids in the sample.

Of the known methods and apparatus for determining or measuring both the bulk and the true volumes of solids, they may be divided into two broad classes, namely, displacement methods and apparatus and buoyancy methods and apparatus. All of these known methods of measurement depend on immersing the solid in some inert fluid, liquid or gaseous, of known density. As an example of the more commonly used apparatus and methods for determining the volume of solids, the steel volumeter might be mentioned. This volumeter is generally constructed of a rectangular or circular container with a cap which rests on a ground taper joint at the upper edge of the container, and the cap has a small hole drilled therethrough. The container is generally filled with a fluid such as mercury and the cap is pressed into a tapered seat so that the excess mercury overflows through the hole in the cap and is thereby removed. Thereafter, the cap is removed and the solid sample is placed on the surface of the mercury and submerged by forcing it downwardly with the cap. The amount of mercury which overflows when the cap is thus pressed downwardly on the solid sample is equivalent to the bulk volume of the sample. Either the volume of mercury which overflows or the loss of weight of the mercury in the volumeter can then be measured and bulk volume calculated.

Another type of apparatus which might be used is known as the Russell volumeter. In this device, the container has mounted thereover a calibrated tube which is adapted to seat on the top of the container. The solid sample to be measured is generally saturated with a suitable liquid and then the volumetric displacement of the same liquid caused by the immersion of the saturated sample is determined. This is accomplished simply by placing the saturated solid sample within the liquid such as kerosine and reading the increased level as indicated on the tube thereabove.

As an example of the buoyancy method of measuring volume of solids, the Westman balance may be considered as illustrative. In this method, the dry weight of the sample and weight necessary to submerge it in mercury are determined. The bulk volume is calculated by dividing the sum of the weight of the dry rock and the weight required to submerge the sample by the density of the mercury.

As will be appreciated, there are also other known apparatuses and methods for determining volumes of solids, but all of these prior constructions and methods have failed to produce a device whereby the actual volume measurement has been sufficiently magnified to yield precise measurements. Furthermore, the prior known structures were generally less easy to read, handle, and use in making the measurements of the solid volumes as compared to the present invention.

It is therefore an object of this invention to provide an apparatus for determining the volume of a solid such as a well core wherein the measurement obtained is greatly magnified to yield precise measurements.

Another important object of this invention is to provide a volumeter having interconnected receptacles containing a fluid wherein one of the receptacles receives the solid to be measured and the other receptacle has thereon an indicator tube which may be calibrated to read directly the volume of the solid being measured.

Another object of this invention is to provide a U-volumeter in which a displaceable fluid is located, the volumeter having an indicator tube with one leg thereof and a solid submerger cap at the top of the other leg so that the solid whose volume is to be measured can be immersed in the fluid by urging the solid submerger cap downwardly, thereby forcing the liquid in the other leg of the U-volumeter upwardly so that a reading of the volume is obtained on the indicator tube.

Another object of this invention is to provide a volumeter for determining the volume of a solid, which volumeter is of U-shape, one of the legs of the U receiving a core or solid submerger while the other leg has connected thereto an indicator tube, the leg having the porous submerger therewith being of reduced diameter as compared to the diameter of the other leg of the volumeter so that a greater displacement of fluid is obtained in the leg having the indicator tube therewith than is obtained in the leg having the solid submerger thereon, such reduced diameter of the leg having the core submerger therewith being capable of control by providing an orifice in the core submerger of still smaller diameter so as to reduce the actual effective diameter of the leg of the volumeter having the core submerger associated therewith.

It is another important object of this invention to provide a volumeter for determining the volume of solids wherein the relative diameters of a U-shaped container or receptacle are predetermined so that a solid immersed in the fluid within the receptacle will displace a greater portion of the fluid into the side or leg of the volumeter at which an indicator tube is connected, such fluid generally comprising two liquids of different densities, the light density liquid being located so as to be displaced into the indicator tube for an even greater increased measurement accuracy.

Other and further objects of this invention will become apparent when the following description is considered in connection with the accompanying drawings, wherein.

Figures 1, 2:
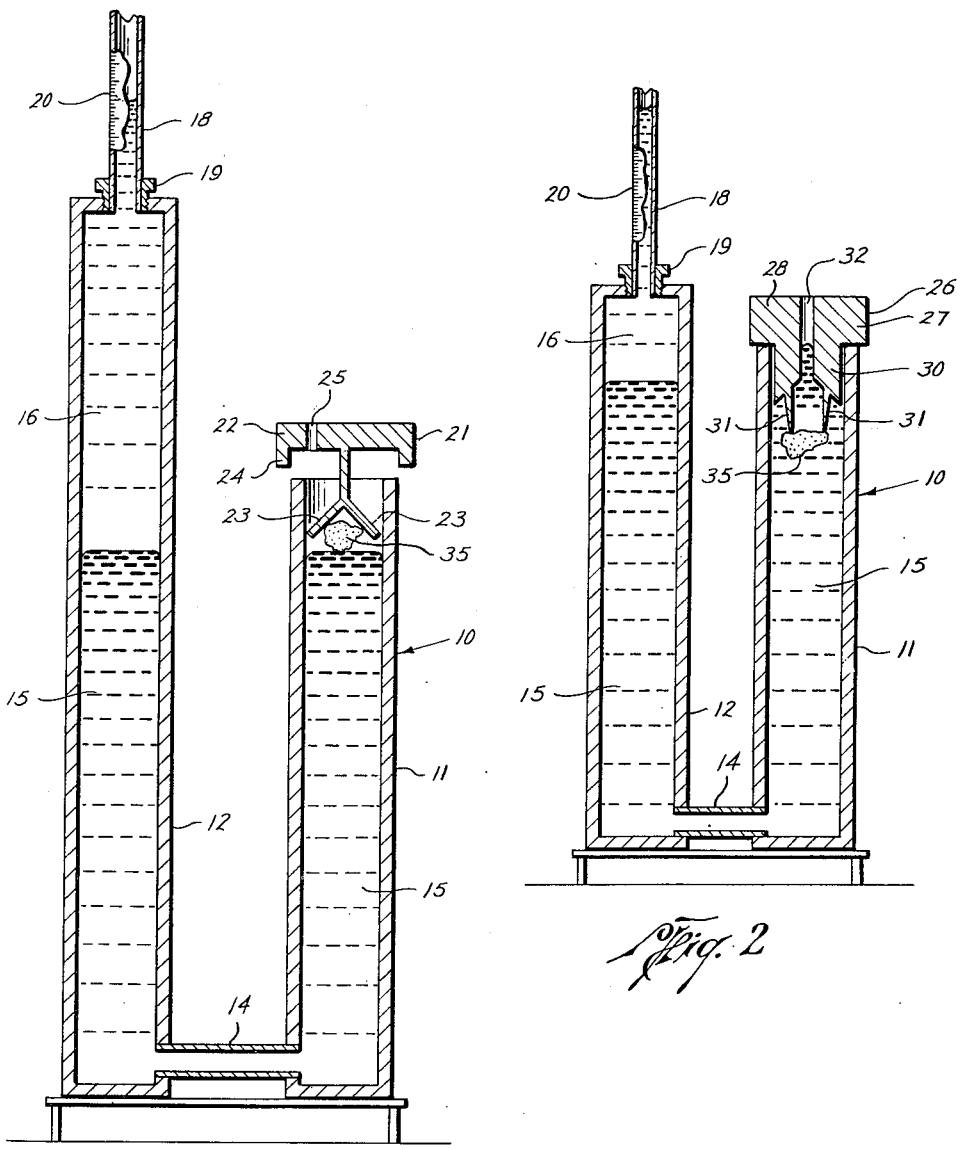
Fig. 1 is an elevational section view of one embodiment of this invention.
Fig. 2 is an elevational section view of another embodiment of this invention, illustrating in particular a different solid submerger structure than that illustrated in Fig. 1.

In the drawing, the volumeter of this invention is generally designated by the numeral 10. This volumeter 10 includes a receptacle 11 and a second receptacle 12. These receptacles or containers 11, 12 are interconnected by a connecting means or pipe 14 at the lower portions thereof. By reason of the interconnecting pipe 14 with the containers or receptacles 11 and 12, the volumeter of this invention assumes a U-shape. This inter-connection 14 permits fluid to move from one receptacle to the other, so that the fluid will be capable of flowing between containers 11 and 12. Preferably the fluid in the volumeter 10 includes two fluids of different densities. For example, the fluid level of the higher density fluid 15 is generally adjusted before immersion of the solid into the fluid 15 at the level so indicated in Fig. 1. A second fluid 16 of lighter density is generally disposed above the fluid level of the fluid 15 in the left-hand leg as seen in Figs. 1 and 2. The liquid 15 is preferably mercury while the liquid 16 may be of water, red manometer oil, hydrocarbon liquids such as nonane or decane, or other similar oil, or any other liquid immiscible with the mercury and of a lighter density than the fluid 15, liquid 16 preferably having a low specific gravity, low viscosity, and a low surface tension value. The advantages and the effect of using the liquids 15 and 16 of different densities will be brought out more in detail hereinafter.

Above the receptacle or container 12 is located an indicator tube 18 which is suitably secured to the container 12 by means of a threaded nut 19 or by other suitable affixing means. This indicator tube 18 is shown as extending from the top of the container 12 although it will be appreciated that it may be projecting from the side of the container 12 so long as it is in the proximity of the top portion of the container 12. This indicator tube may be inclined or perpendicular, and it is preferably made of glass, and ordinarily will be formed of glass capillary tubing. The indicator tube 18 has generally a scale 20 marked thereon or a separate scale may be positioned adjacent thereto so that the volume level will indicate the desired information such as the bulk volume of the sample being measured. It will be appreciated, of course, that the markings or calibration on this indicator tube scale 20 or a separate scale (not shown) may be made so that any appropriate desired reading such as the bulk volume of the sample may be obtained directly.

Slidably fitting within the upper opening of the receptacle or container 11 is a core or solid submerger 21. This core submerger 21 has a cap 22 and fingers 23 extending therefrom. The cap extends outwardly with a flange portion 24 to obtain limited downward movement of the core submerger 21. This core submerger 21 has an opening 25 in the cap 22 to permit air or other fluid to pass therethrough.

In the modification shown in Fig. 2, the basic construction of the volumeter is essentially the same; however, the core submerger is considerably modified and is indicated by the numeral 26. This core submerger 26 has a flange portion 27 which extends outwardly from the cap 28 to permit limited downward movement of the core of solid submerger 26. Below the flange portion 27 of the cap 28 is an extension 30 which has projecting therefrom fingers 31. Substantially centrally disposed in the core submerger 26 is an orifice or opening 32 which as can be seen in Fig. 2 extends through the flanged portion 27 and the extension 30.

In the operation of the modification shown in Fig. 1, the core submerger 21 is placed in position and the fluid level in tube 18 is read. Then the core submerger 21 is removed, the solid or well core 35 is placed on the surface of the fluid 15, and the core then is immersed therein by forcing it downwardly with the fingers 23 of the core submerger 21. When the core is thus immersed in the fluid or liquid 15, and the core submerger 21 is in position, the levels of the fluid rise in both the containers 11 and 12 as well as in the capillary indicator tube 18. The amount that these levels rise is a function of the diameters of the various legs of the volumeter 11, 12, and 18, the densities of the two liquids 15 and 16, and the bulk volume of the solid 35. The ratio of the bulk volume of the solid 35 to the rise of the liquid in the capillary tube 18 is shown by the following formula wherein $V_c$ is the bulk volume, $\Delta h_3$ is the amount of rise in the tube 18, $d_1$ is the effective diameter of leg 11, $d_2$ is the diameter of leg 12, $d_3$ is the diameter of tube 18, $P_1$ is the density of fluid 15, $P_2$ is the density of liquid 16:

$$\frac{V_c}{\Delta h_3} = \frac{\pi}{4}\left[d_3^2 + \frac{P_2}{P_1}d_1^2 + \frac{d_1^2 d_3^2}{d_2^2}\left(1 - \frac{P_2}{P_1}\right)\right]$$

Thus it can be seen that qualitatively, the amount of rise of liquid in the capillary indicator tube 18 per unit of volume of core sample 35 will be greater for a smaller diameter of the tube 18, for a smaller diameter of the container or leg 11 and for a larger diameter of the leg or container 12, and for a smaller ratio of the densities of the fluids 15 and 16. Thus the displacement volume, which is equivalent to the bulk volume of the solid 35 may be read as an increase in liquid level in the indicator tube 18; and this reading may be magnified by the proper choice of volumeter dimensions and ratio of liquid densities.

As an example of volumeter dimensions which can be used for measuring the bulk volume of oil and gas well core samples, the following dimensions could be used: assuming the bulk volumes of the solids to be measured are usually 5 to 10 cubic centimeters, the diameter of the container 11 could be the same size as the diameter of the container 12 and would preferably be about 3 centimeters, while the diameter of the indicator tube 18 would be about 2 millimeters. A volumeter of these dimensions with mercury and normal nonane as the confining liquid 15 and indicating liquid 16, respectively, will show a response of approximately 2 centimeters of liquid rise in the indicator tube 18 for each cubic centimeter of core or solid volume. A volumeter with the same dimensions except with the diameter of the container 11 of about 3 millimeters and with the same liquid will have a response of about 30 millimeters of liquid rise for each cubic centimeter of core volume. The reading on the indicator 18 can be greatly magnified in this manner. Such magnification is particularly desirable when measuring the bulk volume of small core chips whose volumes are less than one cubic centimeter.

In order to obtain the advantages of having a small diameter in the container 11 and at the same time to permit the insertion of relatively large sizes of core samples, the modification shown in Fig. 2 has been devised. In the operation of the construction of Fig. 2, the sample 35 is immersed in the fluid 15 by downward urging of the fingers 31 on the core submerger 26. In Fig. 2, it can be seen that the extension 30 fits snugly into the inside of the container 11. This fit generally has a tolerance of about two thousandths of an inch, so that the core submerger 26 may easily be inserted and withdrawn, yet a fluid such as mercury because it is a non-wetting liquid will not penetrate this small annular space but will be forced up the orifice or hole 32 in the center of the submerger 26. Since the mercury or other fluid 15 is thus forced up into the orifice 32, the effective diameter of the leg or container 11 is that of the orifice 32 rather than the diameter of the container 11. This modification takes advantage of the hydrostatic paradox that the static pressure of a column of liquid is independent of the cross-sectional area to force most of the volumetric displacement caused by the immersion of the sample 35 into the fluid 15 into the left-hand container 12 of the volumeter which in turn causes a greatly increased rise of the liquid level 16 in the capillary indicator tube 18.

From the above description, it is believed apparent that a volumeter for measuring the volume of solids has been devised whereby a greatly increased accuracy is made possible by the use of the two liquids with different densities and a suitable combination of volumeter dimensions. It is also believed apparent that the use of the modified core submerger 26 as shown in Figure 2 enables a reduced diameter to be obtained in the right-hand leg 11 of the U-volumeter so that an even greater accuracy may be obtained than previously.

It will be appreciated that the size of the orifice 32 may be varied and in some cases, it may be desirable to provide different submergers 26 with different sizes of orifices 32 in order to provide desired variations in the readings on tube 18 for different sizes of solids whose volumes or other properties are to be determined.

The use of different submergers 26 with different sizes of orifices 32 becomes extremely important when measuring the bulk volumes of well cores, since such cores vary in size considerably for different samples. By providing a smaller orifice 32 for a smaller core sample, a greater variation can be obtained in the scale read, and thus the accuracy of the measurement can be increased for the smaller cores where such accuracy becomes more critical.

The foregoing disclosure and description of the invention is illustrative and explanatory thereof and various changes in the size, shape and materials, as well as in the details of the illustrated construction, may be made, within the scope of the appended claims, without departing from the spirit of the invention.

What is claimed is:

1. In a volumeter for determining the volume of a solid, a first elongate receptacle having an opening at the top thereof to receive the solid whose volume is to be determined, a second elongate receptacle, said first and second receptacles having fluid therein, means interconnecting said receptacles so that the fluid may flow to and from said receptacles, an indicator tube connected near the top of said second receptacle, said indicating tube having a reduced diameter as compared to the diameter of said second receptacle, and a solid submerger adapted to slidably fit into said opening at the top of said first receptacle and having depending fingers to engage the solid to immerse the solid into the fluid, said solid submerger having an orifice therethrough of reduced diameter as compared to the diameter of said first receptacle, whereby upon immersion of the solid into the fluid there is a displacement of the fluid into said indicator tube and into said orifice, said reduced diameter of said orifice increasing the amount of fluid displaced in said indicator tube as compared to the amount of fluid displacement which would occur if such orifice of reduced diameter were not present.

2. A volumeter for determining the volume of a solid, comprising a pair of elongate receptacles each having a fluid therein, means interconnecting said receptacles so that the fluid may flow from one of said receptacles to the other, an indicator tube connected to one of said receptacles in proximity to the top thereof, said indicating tube being of a smaller cross-sectional area than the cross-sectional area of the receptacle to which it is connected, and a solid submerger adapted to slidably fit into the upper end of the other of said receptacles and having depending fingers to engage the solid to immerse the solid into the fluid with the fluid being displaced upwardly around the fingers and above the solid and also to effect displacement of the fluid into said indicator tube, whereby an indication of the volume of the immersed solid is obtained, said solid submerger comprising a cap having a flange portion thereon to limit the movement of the cap into the receptacle, an extension on said cap of substantially the same cross-sectional area as the cross-sectional area of the inside of the receptacle, said fingers extending from said extension to contact the solid for immersion in the fluid, there being an opening through said flange portion and said extension to permit movement therein of displaced fluid from the receptacle.

3. The structure set forth in claim 1, wherein the fluid in said receptacles includes a first fluid in said first and second receptacles, and a second fluid of less density than said first fluid disposed in said indicator tube and above said first fluid in the second receptacle to provide a change in the fluid level in said indicator tube when the solid is immersed in the fluid which is greater than the change which would occur if the fluid had the same density.

References Cited in the file of this patent

UNITED STATES PATENTS

| | | |
|---|---|---|
| 2,118,229 | Reynolds | May 24, 1938 |
| 2,236,583 | Selvig | Apr. 1, 1941 |
| 2,302,099 | Bittner | Nov. 17, 1942 |
| 2,500,443 | Winton | Mar. 14, 1950 |